Patented Aug. 4, 1953

2,647,868

UNITED STATES PATENT OFFICE 2,647,868

COLOR REMOVAL FROM ESTERS

Fred Dean, Norton-on-Tees, England, assignor to Imperial Chemical Industries Limited, a corporation of Great Britain No Drawing. Application December 28, 1950, Serial No. 203,209. In Great Britain December 30, 1949

2 Claims. (Cl. 204—158)

This invention relates to a process for the removal of undesired colouration from esters of alcohols containing at least 6 carbon atoms.

This process is particularly applicable to esters of alcohols prepared from olefines by the so-called Oxo process, the preparation of these esters involving treatment, at elevated temperature, of an alcohol with an organic carboxylic acid or an anhydride thereof in the presence of a strong acid as catalyst. Di-3,5,5-trimethyl hexyl phthalate, prepared by reacting, at elevated temperature, 3,5,5-trimethyl hexanol with phthalic anhydride, using as a catalyst a small quantity of a strong acid such as sulphuric acid, is a representative of this class of compounds and will hereinafter be referred to as the chief example.

Unless the alcohol employed in the preparation of such di-3,5,5-trimethyl hexyl phthalate is carefully purified, a yellow or brown colouration, undesirable for a number of purposes for which the ester is to be used, tends to be developed.

A similar colour is developed even if the ester is prepared in the absence of an acidic catalyst, if reaction temperatures, at least local, in excess of the limit of thermal stability of the alcohol are employed. Reference may be made, in this connection, to our co-pending United States patent application Serial No. 197,522.

It is believed that the colouration is due to the presence of unsaturated aldehydic or ketonic impurities in the alcohol.

Once formed, such colouration is not easily removed by the usual chemical bleaching or physical adsorption technique. Furthermore, in the case of high-boiling esters such as are required for synthetic polymer plasticisers, as for example di-3,5,5-trimethyl hexyl phthalate, purification by distillation is not practicable, as their vapour pressures are too low.

We have now found that exposure to transverse daylight of thin layers of esters discoloured in the manner indicated, more particularly to light from the near ultraviolet region of the spectrum, causes them to be effectively bleached. By "thin layers" we mean in this specification layers of up to 5 mm. thickness. In the case of a number of compounds including di-3,5,5-trimethyl hexyl phthalate the wave length of maximum bleaching efficiency was found to lie at approximately 3650Å. The bleached esters are colour stable and can be compounded with polymers such as polyvinyl chloride without redeveloping their original colour. This is of particular advantage when colourless plasticised polymers are required.

The method may be applied to deeply coloured esters, although in this case, when used alone, it offers no striking advantage over the normal chemical bleaching or physical adsorption methods, the rate of decolouration being slow. The method is particularly useful for the complete decolourisation of esters which are not deeply coloured, such as esters displaying, in a six inch cell, up to 3 Lovibond Units in the red, and up to 5 to 10 such units in the yellow. This application of the invention, which is the preferred one, can be used either by applying the method by itself to esters which, as made, are coloured only to the extent indicated, or by applying the method as a supplementary process to other known or suitable methods for the decolourisation of more highly coloured esters, for example such as display in a six inch cell, say, about 20 to 30 Lovibond Units in the red, and a similar number of such units in the yellow. The product to be treated should not be grossly contaminated, for example with tars or inorganic materials.

In order to operate the invention efficiently, a high intensity light source should be used, the thin layers should preferably be of a thickness up to about 3 mm. and the material should preferably be exposed to the light for some hours.

Some examples will now be given of the application of the invention to di-3,5,5-trimethyl hexyl phthalate, colours being quoted throughout as Lovibond Units obtained in a cell of six inches length.

*Example 1*

A sample of di-3,5,5-trimethyl hexyl phthalate (colour: 1.0 red, 5.0 yellow) was irradiated with sunlight through glass (which allowed the passage of about 50 per cent of light of wavelengths in the region of 3650Å) for approximately 8 hours. The colour of the resulting product was: nil red, 0.5 yellow. There was no detectable change in the chemical analysis of the ester.

*Example 2*

(a) A sample of di-3,5,5-trimethyl hexyl phthalate (colour: 7 red, 10 yellow) was irradiated, in a cell confining it to 3 mm. thickness, with the light from three 125 watt mercury arc lamps, positioned at a distance of 10 cms. from the sample, at a temperature of 50° C. Complete decolourisation occurred within 5 hours.

(b) A similar and similarly confined sample was exposed, again at a temperature of 50° C., to the visible radiation only of the light source referred to, a filter shutting out the ultraviolet part of the spectrum. After 18 hours' exposure the ester was still appreciably coloured.

(c) Experiment 2(a) was repeated, oxygen this time being specifically excluded. The rate of colour removal was not appreciably different from that obtained when no precautions were taken to exclude oxygen.

*Example 3*

A sample of di-3,5,5-trimethyl hexyl phthalate (colour: 7 red, 20 yellow) was shaken for 5 minutes with an equal volume of a technical bleaching solution, comprising chlorine, at 20° C. The bleaching agent was then removed by washing with water, and the ester was dried over anhydrous sodium sulphate, after which the percentage of chlorine in the ester was found to be below 0.001%. The colour of the ester was now 5 yellow. Irradiation with sunlight then effected complete decolourisation.

Similar results to the above have been obtained with phthalates, orthophosphates and glutarates of alcohols selected from the following: Oxo process nonanols, 2-ethyl-hexanol-1, butanol and the $C_6$ to $C_9$ mixed Oxo alcohols obtained by carbonylating olefines derived from the cracking of petroleum waxes with carbon monoxide and hydrogen at elevated temperature and pressure in the presence of a cobalt catalyst and hydrogenating the carbonylation product.

The colours of the following esters which initially were in the order of up to 5 red together with up to 20 yellow, have all been reduced down to the order of nil red, ≦1 yellow by prolonged periods of exposure to sunlight (up to 10 days): tri-3,5,5-trimethyl hexyl, di-3,4,5-trimethyl hexyl phthalate, di-4,5,5-trimethyl hexyl phthalate, di-3,4,4-trimethyl hexyl phthalate, di-alkyl phthalates obtained from the $C_6$ to $C_9$ Oxo alcohols mentioned previously, di-3,5,5-trimethyl hexyl glutarate, di-3,5,5-trimethyl hexyl sebacate, 3,5,5-trimethyl hexyl butyl phthalate obtained with the use of mixed butanols, isopropyl 3,5,5-trimethyl hexyl phthalate, and dibutyl phthalate obtained with the use of mixed butanols. The time required for the decolourisation of these esters would be much reduced by exposing them to the light in thin layers according to the invention.

I claim:

1. A process for removing undesired colouration from esters selected from the group consisting of the phthalates, ortho-phosphates and glutarates of alcohols having at least six carbon atoms and not more than nine carbon atoms in the molecule, said alcohols having been prepared by carbonylating olefines with carbon monoxide and hydrogen under elevated temperature and pressure in the presence of a cobalt catalyst and hydrogenating the carbonylation product, said esters displaying in a six-inch cell of a standard Lovibond colorimeter up to three units in the red, together with up to ten units in the yellow, which comprises exposing said esters as a thin layer having a thickness not in excess of five millimeters to transverse light containing a substantial proportion of a wave length approximately equal to 3650Å.

2. A process as recited in claim 1 in which the said thin layer has a thickness which does not exceed about three millimeters.

FRED DEAN.

References Cited in the file of this patent
UNITED STATES PATENTS

| Number | Name | Date |
|---|---|---|
| 939,733 | Minor | Nov. 9, 1909 |
| 1,948,281 | Smith | Feb. 20, 1934 |
| 2,149,765 | Goos et al. | Mar. 7, 1939 |